United States Patent
Onishi et al.

[11] 4,030,809
[45] June 21, 1977

[54] OPTICAL CONNECTOR

[75] Inventors: Makoto Onishi, Kokubunji; Katsuyuki Nagano, Kokubunji; Toshiki P. Tanaka, Kokubunji; Sadao Matsuoka, Kanagawa; Mitsuo Tanaka, Ohme, all of Japan

[73] Assignee: Hitachi, Ltd., Japan

[22] Filed: July 9, 1975

[21] Appl. No.: 594,363

[30] Foreign Application Priority Data
July 17, 1974 Japan .............. 49-81111

[52] U.S. Cl. .................................. 350/96 C
[51] Int. Cl.² ................................. G02B 5/16
[58] Field of Search ..................... 350/96 C

[56] References Cited
UNITED STATES PATENTS

| | | | |
|---|---|---|---|
| 3,864,018 | 2/1975 | Miller | 350/96 C |
| 3,885,859 | 5/1975 | Dalgleish et al. | 350/96 C |

OTHER PUBLICATIONS

Casler "Manufacturing Matched Fiber Optical Arrays" IBM Tech. Dis. Bulletin, vol. 14, No. 3, Aug. 1971, p. 829.

Primary Examiner—Edward S. Bauer
Assistant Examiner—Stewart Levy
Attorney, Agent, or Firm—Craig & Antonelli

[57] ABSTRACT

In an optical fiber connector, the pair of optical fibers to be connected together are placed end-to-end in a linear groove which has been formed on a lateral surface of a central cylinder. They are held fixed by a holding member which is fitted in the groove and is moved towards the optical fibers according to the rotation of a hollow cylinder which externally touches the central cylinder, whereby the optical fibers can be connected with a precise alignment and accordingly with a low optical power loss.

5 Claims, 6 Drawing Figures

OPTICAL CONNECTOR

FIELD OF THE INVENTION

This invention relates to improvements in an optical fiber connector for use in optical communication systems.

BACKGROUND OF THE INVENTION

In general, there are two types of optical fibers. One type comprises a core material of uniform refractive index surrounded by a cladding having lower refractive index. The other type is a graded index fiber comprising a material wherein the refractive index tapers off from a maximum value at the center to a minimum value at the outer surface.

When using such optical fibers in an optical transmission line connecting an optical signal source to an optical signal receiver, it is important to connect the optical fibers with a precise alignment and, accordingly, with a low optical power loss at the point of connection.

If each of the two end surfaces of two optical fibers to be connected is perpendicular to the central axis thereof and, furthermore, has a precise flatness and purity, then the connection of these optical fibers can be easily realized with a low optical power loss by merely directly aligning the two end surfaces.

It is generally the case, however, that the central axes of the optical fibers tend to become deflected and inclined at the point of connection and that the deflection and inclination causes an increase in the optical power loss at the point of connection.

Conventional optical fiber connectors for connecting two optical fibers with a precise alignment do exist, but all of these conventional optical fiber connectors require particularly fine adjustment for precise alignment or positioning, and furthermore, require highly precise machining, highly skilled techniques in the connection of the optical fibers and so on. As such, conventional connectors are not considered to be of a practical or useful nature as their operation is complicated and requires much time.

For instance, the methods of fixing the two end surfaces of the optical fibers with adhesives, welding the two end surfaces, and so on, require the use of a precise three-dimensional fine adjustment microscope and so on in order to decrease the axial deflection and inclination of the optical fibers. Thus, these methods require operations which are so complicated that they do not have any pratical value.

There is yet another method of connecting optical fibers, which consists of forming a groove corresponding to the shape of the optical fibers in a plate made of plastic material, arranging the optical fibers into the groove and holding them fixed with a holding plate therein, but this method also requires so many operations and so much time that is can never be deemed to be of useful or practical value.

BRIEF SUMMARY OF THE INVENTION

It is an object of the present invention to provide a practical and convenient optical fiber connector which can be easily operated in the open air.

According to the present invention, a pair of optical fibers to be connected are placed end-to-end in a linear groove which has been longitudinally formed on a lateral surface of a central cylinder, and they are held fixed by a holding member which is fitted in the groove and is moved towards the optical fibers, i.e., in the direction of the groove depth, according to the rotation of a hollow cylinder which externally touches the cylinder, whereby the optical fibers can be connected with a precise alignment and thus with resultant low optical power loss.

DETAILED DESCRIPTION

The present invention will now be explained in detail with reference to its various embodiments.

Figure 1:
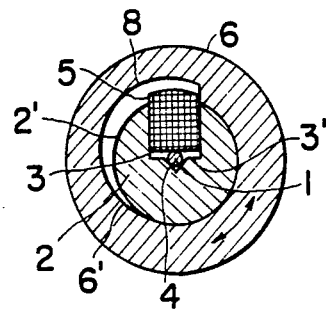
FIG. 1 is a cross-sectional view illustrating an embodiment of the present invention.

FIG. 1 shows a cross-sectional view of one embodiment of the present invention. Numeral 1 denotes the optical fiber (or fibers) to be connected. A central cylinder 2 has a linear groove (or first groove) 3 longitudinally (or axially) formed on the lateral surface 2' thereof and a smaller linear groove (or second groove) 4 axially formed on the bottom surface 3' on the groove 3, for arranging a pair of optical fibers to be connected therein. A holding member 5 is fitted in the groove 3 and has a height greater than the depth of the groove 3. A hollow cylinder 6 is rotatable around the outside of the cylinder 2 inscribed thereto and has a diametrical graded portion 8 in the inner surface 6' thereof corresponding to the groove 3 of the cylinder 2. Although, in this example, the height of the holding member 5 is higher than the depth of the groove 3, it does not necessarily have to be higher.

The holding member 5 is forceably slidable towards the optical fiber 1 arranged in the smaller groove 4 according to the relative rotation between the cylinder 2 and the hollow cylinder 6, causing contact between the graded portion 8 of the hollow cylinder 6 and the holding member 5. Thus, the optical fibers can be held fixed and connected with a precise alignment.

Figure 3:
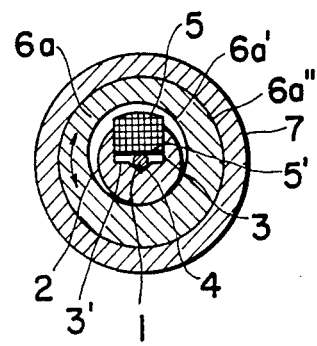
FIG. 3 is a sectional view of the I—I' plane of FIG. 2.
Figure 2:
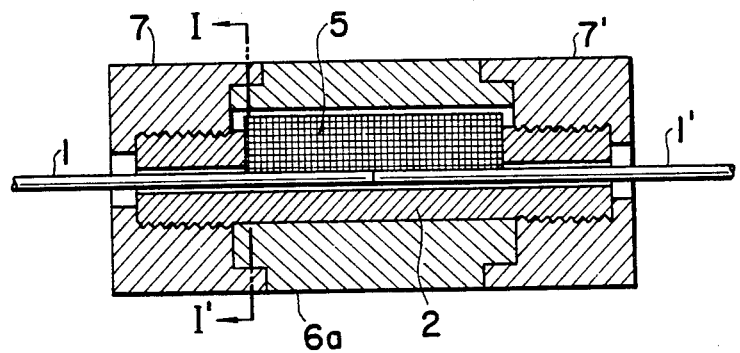
FIG. 2 is a view of a longitudinal section illustrating another embodiment of the present invention.

FIG. 2 is a view of the longitudinal cross section showing another embodiment of the present invention, and FIG. 3 is a sectional view at the I—I' plane of FIG. 2. In these figures, numerals 1 and 1' denote a pair of optical fibers to be connected, and 6a is a hollow cylinder, the inner surface (or inner circle) 6a' of which and the outer surface (or outer circle) 6a'' of which are mutually eccentric. The numberals 7 and 7' denote the guiding members as fixed (or screwd) near both ends of the cylinder 2, as shown in FIG. 2. The hollow cylinder 6a is rotatable along the sliding portions of the guiding members 7 and 7'. The holding member 5 is forcedly moved towards the optical fibers 1 and 1' according to the relative rotation between cylinder 2 and the hollow cylinder 6a while sliding on the eccentric inner surface 6a', of the hollow cylinder 6a, so that the optical fibers 1, 1' can be held stable in the groove.

In the present invention, the optical fibers as arranged in the small groove 4 need to protrude somewhat above the bottom surface of the groove 3.

If they do not do so, they cannot be held down by the lower surface 5' of the holding member 5. The desirable flatness and purity of the end surfaces of the optical fibers are achieved by using any general method.

Furthermore, the end surfaces of the two optical fibers arranged in the small groove 4 need not necessarily be in contact with one another as shown in FIG. 2. Even if they are slightly separated, the effectiveness as an optical transmission line is not influenced as will be well appreciated by those skilled in the art.

As a practical example of the optical fiber connector as shown in FIGS. 2 and 3, either of the optical fibers may be multimode fibers having a diameter of 100 to 200 μm. The diameter of the cylinder 2 may be 2 mmφ, and the width and depth of the groove 3 may be 1.5 mm. and 1 mm., respectively. The small groove 4 may have the depth of 100μm and a triangular cross section with a base angle of 90°. The diameters of the outermost circle and eccentric inner circle of the hollow cylinder 6 may be 5 mmφ and 3.5 mmφ, respectively. Its eccentric distance may be 0.5 mm. Furthermore, the whole length and diameter of the optical fiber connector including the guiding members 7 and 7' as shown in FIG. 3 may be 20 mm. and 50 mmφ, respectively. In the configuration described above, an optical power loss of 1 to 0.1 dB was measured.

In the above case, the optical fiber connector was made of brass, but the present invention is not only applicable to brass, but also any other material such as stainless steel, aluminum alloy and so on. Furthermore, it is needless to say that the present invention is not limited to the above-mentioned numeral values or to the fact that the cross section of the small groove 4 is rectangular as shown in FIGS. 1 to 3.

Figure 4:
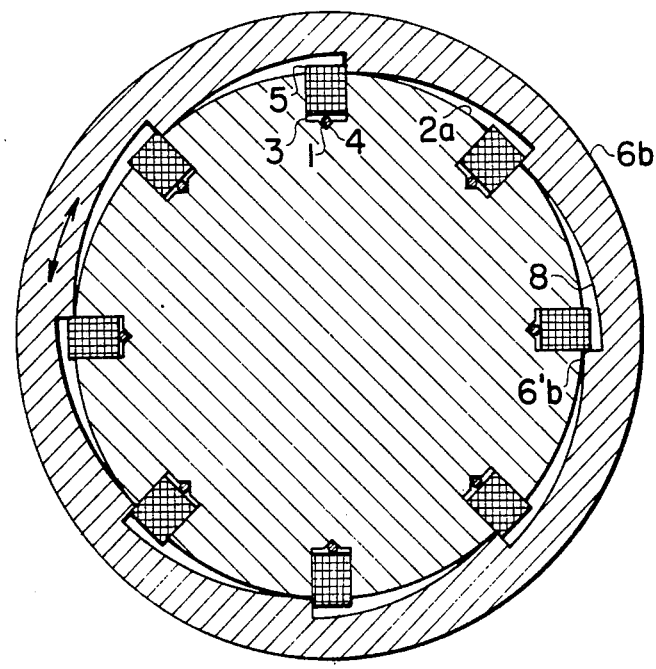
FIGS. 4 to 6 are cross sectional views showing further embodiments of the present invention for use with an optical fiber cable.

FIG. 4 is a sectional view showing an optical fiber connector, according to the present invention, for use with an optical fiber cable.

In the drawing, numeral 2a denotes a cylinder having a plurality of the grooves 3 and the small grooves 4 provided axially on the lateral surface thereof, for holding a plurality of pairs of optical fiber 1.

Numeral 6b denotes the hollow cylinder having the diametrical graded portion on the inner surface 6'b thereof corresponding to the respective grooves 3 of the cylinder 2a. The respective holding members 5 can be forcedly moved towards the corresponding optical fibers 1 by the relative rotation of the cylinder 2a and the hollow cylinder 6b, so that each pair of optical fiber cables can be easily connected.

Figure 5:
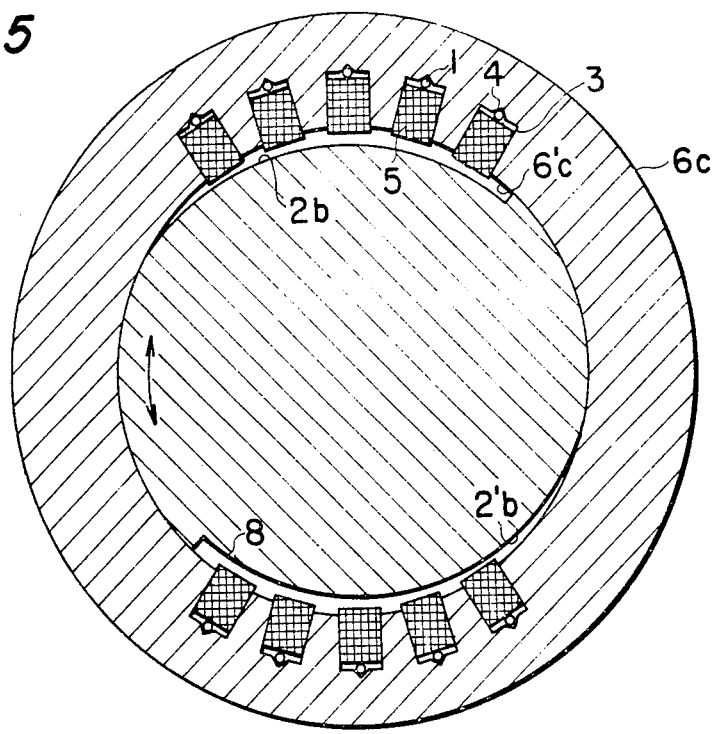

FIG. 5 is a sectional view showing another optical fiber connector for use in an optical fiber cable and illustrates an example of a plurality of the holding members 5 being held down by one graded portion of the cylinder 2b. In this case also, the optical fibers 1 can be held fixed by forcedly moving the holding members 5 towards the corresponding optical fibers 1 by the relative rotation between the cylinder 2a and the hollow cylinder 6b. However, this case is different from the cases of FIGS. 1 to 4.

A plurality of the grooves 3 and the small grooves 4 are provided on the inner surface 6'c of the hollow cylinder 6c. The cylinder 2b inscribed in the hollow cylinder 6c has at least one diametrical graded portion of the surface 2'b corresponding to at least groove 3, which can move the holding members 5 towards the optical fibers 1 according to the relative rotation of 2b and 6c and hold fixed the optical fibers 1 in the groove.

In the drawing, some of the device mechanisms for holding the optical fibers 1 in the grooves 4 have been intentionally omitted, but they will be easily understood by the preceding disclosure.

The present invention is not limited to the above arrangement, however, but is variously conceivable.

Figure 6:
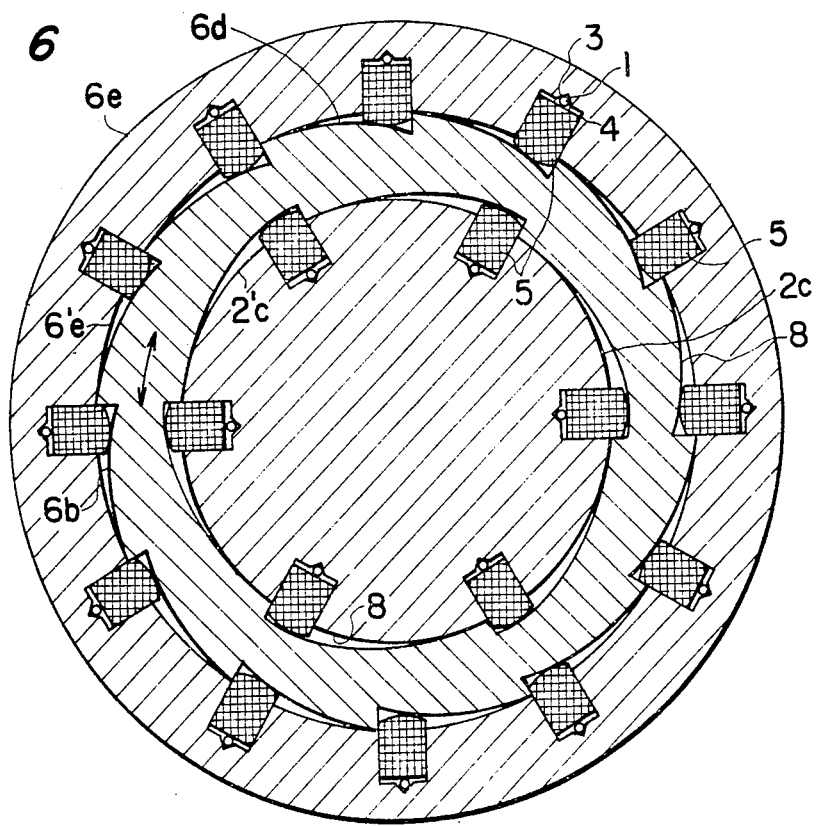

Illustrated in FIG. 6 is a sectional view of yet another optical fiber connector for use in an optical fiber cable. Numeral 2c indicates a central cylinder for holding optical fibers 1, 6d one (intermediate) hollow cylinder for pressing the holding member 5 and 6c, a second (outermost) hollow cylinder for holding optical fibers 1.

The cylinder 2c is inscribed in the first hollow cylinder 6d and touches internally the second hollow cylinder 6e. The second hollow cylinder 6e works in unison with the cylinder 2c.

A plurality of the grooves 3 and the small grooves 4 for holding the optical fibers 1 are provided on the inner surface 6'e of the second hollow cylinder 6e and on the outer surface 2'c of the cylinder 2c. The first hollow cylinder 6d has graded portions on both the outer surface and the inner surface corresponding to the grooves 3 of both the second hollow cylinder and the cylinder 2c as shown in FIG. 6. As such, it is possible to hold the optical fibers 1 by rotating the first hollow cylinder 6d (or in general, the relative rotation). The present invention is not only applicable to the optical fiber cables of the two layer constitution as shown in the drawing, but also to those of the multi-layer constitution.

As is explained in detail above, according to the present invention, the optical fibers to be connected are arranged in the linear groove and held down in the small groove by the holding member. Accordingly, the optical fibers can be held fixed in the small groove, and thus axial deflection and inclination of the optical fibers can be highly reduced and stabilized to fibration and the like.

Furthermore, the groove and the small groove for arranging the optical fibers need not be machined by any special technique, but can be relatively easily machined by any conventional method. Furthermore, the mechanism of moving the holding member according to the relative rotation between the hollow cylinder and the central cylinder can function effectively even if the optical fiber connector is made small. Therefore, according to the present invention, a practical and small-sized optical fiber connector with precise alignment and high operation efficiency can be produced.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. An optical fiber connector comprising, in combination: a first holding member having a axis, at least one first groove extending axially in the surface of said axis, and at least one second groove extending axially in the base of the surface of said at least one first groove, said at least one second groove receiving a plurality of optical fiber sections to be connected optically therein; a second holding member extending along said axis and having a surface which contacts said first holding member and is diametrically graded at a portion thereof facing said first groove in said first holding member; and a coupling member, fitted in said first groove and being forcedly urged towards said optical fiber sections in said second groove of said first holding member by the relative displacement of said first and second holding members so that the diametrically graded portion of said second holding member contacts said coupling member and forces said coupling member against said optical fiber sections, to thereby fixedly hold said optical fiber sections in said second groove of said first holding member, wherein said first holding member is a hollow cylinder having said first groove formed axially in the inner surface thereof and said second groove formed axially in the base of said first groove, and said second holding member comprises a central cylinder extending axially within said hollow cylinder, the outer surface of said central cylinder having said diametrically graded surface portion facing said at least one first groove in said hollow cylinder.

2. An optical fiber connector comprising, in combination: a first holding member having an axis, at least one first groove extending axially in the surface of said axis, and at least one second groove extending axially in the base of the surface of said at least one first groove, said at least one second groove receiving a plurality of optical fiber sections to be connected optically therein; a second holding member extending along said axis and having a surface which contacts said first holding member and is diametrically graded at a portion thereof facing said first groove in said first holding member; and a coupling member, fitted in said first groove and being forcedly urged towards said optical fiber sections in said second groove of said first holding member by the relative displacement of said first and second holding members so that the diametrically graded portion of said second holding member contacts said coupling member and forces said coupling member against said optical fiber sections, to thereby fixedly hold said optical fiber sections in said second groove of said first holding member, wherein said first holding member is a first cylinder having said first groove formed axially in the lateral surface of said cylinder and said second groove formed axially in the base of said first groove, and said second holding member comprises a hollow cylinder which is rotatable around said first cylinder, the inner hollow surface of said hollow cylinder having said diametrically graded portion facing said first groove in said first cylinder.

3. An optical fiber connector according to claim 2, further comprising a further hollow cylinder surrounding the first mentioned hollow cylinder, said further hollow cylinder having at least one third groove formed axially in the inner surface thereof and at least one fourth groove formed in the base of said third groove, said at least one fourth groove receiving optical fiber sections, the outer surface of said first mentioned hollow cylinder having at least one diametrically graded portion facing said at least one third groove in said further hollow cylinder, and further including at least one further coupling member disposed in said at least one third groove, said further coupling member being urged towards the optical fiber sections in said at least one fourth groove by the diametrically graded portion of the outer surface of said first mentioned hollow cylinder.

4. An optical fiber connector comprising, in combination: a first holding member having an axis, at least one first groove extending axially in the surface of said first holding member and at least one second groove extending axially in the base of the surface of said first groove, said second groove receiving a plurality of optical fiber sections to be connected optically therein; a second holding member extending along said axis and having a surface which contacts said first holding member and is diametrically graded at a portion thereof facing said first groove in said first holding member, and being concentrically rotatable against said first holding member; and a coupling member, fitted in said first groove and being forcedly urged towards said optical fiber sections in said second groove of said first holding member by the relative rotation of said first and second holding members about said axis so that the diametrically graded portion of said second holding member contacts said coupling member and forces said coupling member against said optical fiber sections, to thereby fixedly hold said optical fiber sections in said second groove of said first holding member.

5. An optical fiber connector according to claim 4, wherein the height of said coupling member in said first groove is greater than the depth of said first groove in said first holding member.

* * * * *